(No Model.)
W. R. PATTERSON.
TERMINAL FOR ELECTRIC LIGHT CABLES.
No. 324,413. Patented Aug. 18, 1885.
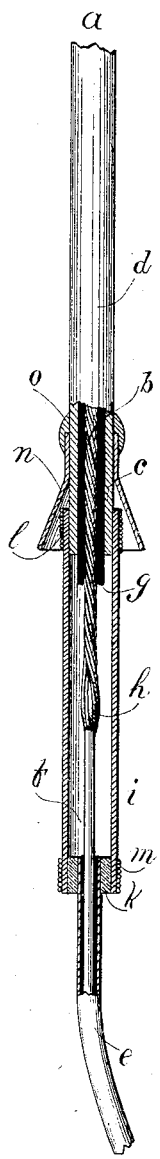

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

TERMINAL FOR ELECTRIC-LIGHT CABLES.

SPECIFICATION forming part of Letters Patent No. 324,413, dated August 18, 1885.

Application filed September 22, 1884. (No model.)

*To all whom it may concern:*

Be it known that I, WILLIAM RODNEY PATTERSON, a citizen of the United States, residing at Chicago, in the county of Cook and State of Illinois, have invented a certain new and useful Improvement in Terminals for Electric-Light Cables, (Case 44,) of which the following is a full, clear, concise, and exact description, reference being had to the accompanying drawing, forming a part of this specification.

My invention relates to terminals for electric-light conductors; and it consists in providing an air-space at the end of the cable, whereby moisture is prevented from being carried by capillary attraction to the paraffine or other insulating material of the cable, as herein described and claimed.

My invention is illustrated in the drawing, in which I have shown a partial longitudinal sectional view of my terminal.

The electric-light cable $a$ contains a single strand, $b$, of copper wires, which form the conductor.

The conductor is wrapped with a fibrous material, $c$, and drawn into the lead pipe $d$, after which paraffine is forced in about the conductor and among the pores of the fibrous material in the ordinary manner.

The conductor $e$ is an ordinary electric-light wire insulated and painted with fireproof paint.

The cable $a$ is usually placed under ground, and the conductor $e$ is usually strung upon poles.

The object of my invention is to connect a cable with the outside wire in such manner that moisture cannot be carried by capillary attraction to the fibrous or other porous insulating material of the cable. This is accomplished by providing an air-space, $f$, at the terminal.

The conductor $b$ of the cable is laid bare, and the projecting end $g$ of the fibrous material is preferably covered with shellac. The splice is then made between the conductor $b$ of the cable and the outside conductor, $e$, preferably by soldering the two ends together, as shown at $h$.

Before the conductors are joined together I place upon the conductor $e$ the rubber sleeve $i$, and one or more rubber rings, $k$. Then after the conductors are spliced, as shown at $h$, I slip the rubber sleeve $i$ over the splice and tie said sleeve, as shown, by wires $l$ about the end of cable. The rubber ring or packing $k$ should be of the same diameter as the cable, and the sleeve is secured thereto by means of the wires $m$, as shown.

I then place the hood $n$ about the cable above the upper end of the rubber sleeve $i$, as shown.

The hood may be of lead, tin, or zinc, or other suitable material, and is preferably secured to the lead pipe of the cable by a wipe-joint, $o$. The joint at the upper end of the sleeve is thus protected from the rain by the hood.

Since there is an air-space, $f$, within the sleeve, moisture cannot be carried by capillary attraction to the insulating material $e$ of the cable from the outside.

The coating of shellac varnish at the projecting end of the fibrous covering renders the said covering anhydroscopic, thus preventing moisture being taken up from the air in the space $f$.

I claim—

1. The combination, with the cable and bare splice, of the rubber sleeve and rubber rings, or packing $k$, placed about the outside wire, said sleeve being tied to the cable and outside wire, substantially as and for the purposes specified.

2. The combination, with the sleeve of insulating material secured at one end to the cable and at the other to the outside wire by tight joints, of the naked splice $h$, whereby an air-space, $f$, is formed and moisture prevented from penetrating to the insulating material of the conductor, substantially as and for the purposes specified.

3. The combination, with the insulating material coated with shellac at $g$, of the sleeve secured at its ends to the cable and wire, respectively, whereby a dead air-space is formed about the splice, substantially as and for the purposes specified.

4. The combination, with the rubber sleeve secured to the end of a telegraph-cable, of a hood projecting below the upper end of said sleeve and united to the lead-pipe of the cable by solder, substantially as shown and described.

In witness whereof I have hereunto subscribed my name this 11th day of September, A. D. 1884.

WILLIAM R. PATTERSON.

Witnesses:
GEORGE P. BARTON,
H. ODELL.